United States Patent
Michels et al.

[11] Patent Number: 6,147,181
[45] Date of Patent: Nov. 14, 2000

[54] TWO STEP PROCEDURE FOR THE PRODUCTION OF SEMI-HARD SOLID POLYURETHANE MOLDED BODIES

[75] Inventors: Erhard Michels, Köln; Klaus Pleiss, Bergisch Gladbach; Franz Scholtis, Leverkusen, all of Germany

[73] Assignee: Bayer Aktiengesellschaft, Leverkusen, Germany

[21] Appl. No.: 09/308,112

[22] PCT Filed: Nov. 10, 1997

[86] PCT No.: PCT/EP97/06232

§ 371 Date: May 12, 1999

§ 102(e) Date: May 12, 1999

[87] PCT Pub. No.: WO98/22519

PCT Pub. Date: May 28, 1998

[30] Foreign Application Priority Data

Nov. 20, 1996 [DE] Germany .......................... 196 48 012

[51] Int. Cl.$^7$ ...................................................... G08G 18/42
[52] U.S. Cl. ............................................. 528/76; 525/440
[58] Field of Search ............................... 528/76; 525/440

[56] References Cited

U.S. PATENT DOCUMENTS

| 3,899,623 | 8/1975 | Okazaki et al | 428/290 |
| 4,107,151 | 8/1978 | Takahashi et al. | 528/54 |
| 4,306,052 | 12/1981 | Bonk et al. | 528/67 |
| 4,521,582 | 6/1985 | Goyert et al. | 528/67 |

FOREIGN PATENT DOCUMENTS 0 299 117  10/1994  European Pat. Off. .

*Primary Examiner*—Rachel Gorr
*Attorney, Agent, or Firm*—Joseph C. Gil; N. Denise Brown

[57] ABSTRACT

The invention relates to a process for preparing solid, transparent to translucent polyurethane molded items which, due to their elastic and optical properties, can be used, for instance, as an alternative material to rubber.

5 Claims, No Drawings

TWO STEP PROCEDURE FOR THE PRODUCTION OF SEMI-HARD SOLID POLYURETHANE MOLDED BODIES

The invention relates to a process for preparing solid, transparent to translucent polyurethane moulded items which, due to their elastic and optical properties, can be used, for instance, as an alternative material to rubber.

PUR catalysed resins based on polyesterpolyols are generally used to produce semi-rigid PU moulded items. They are particularly suitable for producing moulded items by the casting or injection moulding process because good results with respect to the hardness of the material and the solidification time can be obtained with these over a wide range of system variations. Complex engineering for machines, filling procedures, mould production and mould closures is not normally required, but may be applied in individual cases.

The use of PUR catalysed resins based on polyetherpolyols is also known but is often not chosen because satisfactory and continuously producible high degrees of transparency can only be achieved by using more complicated engineering procedures. Production by the RIM process using catalysed resins which contain both reactive hydroxy and amine terminal groups and requires the use of special moulding and closure equipment, as has been described in accordance with EP 0 299 117 A1, may be mentioned here. Ultimately, however, when using PUR moulding compositions based on polyetherpolyols, the processing window is always very restricted so that, in contrast, PUR systems based on polyesterpolyols have always been used in preference. Astonishingly, this is the case even for applications in exposed areas where hydrolytic/microbial decomposition of the ester components is prevented only by the incorporation of often very costly protective additives.

It has now been found, surprisingly, that PUR moulding compositions based on ether-polyols can be advantageously processed in the same way as those based on esters to give transparent/translucent moulded items if they have been provided with a much higher average molecular weight, and thus an associated increase in viscosity, in a first process stage. A suitable process stage of this type is in particular the reaction described below with difunctional and/or higher functional components with terminal isocyanate groups to give so-called OH-prepolymers. Reaction with difunctional or higher functional carboxylic acids to give comparably extended ether/ester-polyols has also proven to be suitable.

The invention therefore provides a two-stage process for preparing compact, transparent PUR moulded items by the polyisocyanate/polyaddition process with a Shore A hardness of 40 to 90 by reacting a) organic and/or modified organic polyisocyanates with
b) at least one high molecular weight compound containing at least two reactive hydrogen atoms and optionally
c) low molecular weight chain-extending and/or cross-linking agents in the presence of
d) catalysts and
e) auxiliary agents and additives, characterised in that, as an at least one high molecular weight compound containing at least two reactive hydrogen atoms (b), the reaction product of (I) a linear EO/PO-polyetherpolyol with terminal EO groups and an EO/PO ratio of 15:85 to 40:60, an OH value of 56–28 and a functionality of 2.0, or (II) a mixture of a polyetherpolyol as specified under (I) with another, but higher functional, EO/PO- polyetherpolyol started with glycerine, trimethylolpropane, pentaerythritol or sugar (EO/PO ratio 15:85 to 40:60) with an OH value of 60–25, or (III) mixtures of several linear and branched polyetherpolyols, each of which are composed in the way described under (I) and (II), or (IV) a poly-THF-ether ($C_4$-ether) with an average molecular weight of 500 to 2000 and also (V) combinations of (I), (II), (III) and (IV), when reacted with (A) TDI (2,4-TDI to 2,6-TDI in any ratio) and the prepolymers obtainable therefrom, or (B) TDI-polynuclear isocyanates and the prepolymers obtainable therefrom, or (C) MDI (4,4'-MDI, 2,4'-MDI, 2,2'-MDI in any ratio) and the prepolymers obtainable therefrom, or (D) MDI-polynuclear isocyanates and the prepolymers obtainable therefrom, or (E) any other aromatic isocyanates obtainable on an industrial scale with a functionality of at least 2 (NDI, p-PDI), and the prepolymers obtainable therefrom, or (F) any other aliphatic isocyanates obtainable on an industrial scale with a functionality of at least 2 (IPDI, HDI, H-MDI) and the prepolymers obtainable therefrom, or (G) isocyanate mixtures of (A) to (F).

Each of the prepolymers specified in (A) to (G) are obtained, for example, by reacting the isocyanates with an etherpolyol as described under (I) to (V) and are characterised by the presence of terminal, reactive NCO groups.

Reaction of the polyols described under (I) to (V) is also possible with (AA) difunctional and/or higher functional carboxylic acids such as, for example, adipic acid, glutaric acid, succinic acid and other representative of this class of substances and also their mixtures, instead of with isocyanates.

Furthermore, also "short-chain" reaction components such as $H_2O$, difunctional and trifunctional OH compounds, OH-amines, diamines and triamines, etc, which have been used in the preliminary reaction and have participated in the reaction and specifically alter the properties of the material subsequently reacted to give a polyurethane.

The first reaction stage to give a polyol, as described above, does not necessarily require catalytic acceleration, in the case of the reaction of a diol etc. with diisocyanate, but does proceed substantially more rapidly after the addition of amines, metal salts, etc.

In the case of an ether/ester reaction (AA), typical ester catalysts (Sn and Ti derivatives) are preferred. The reaction temperatures are preferably 20 to 100° C. (types A–G), but higher temperatures are also possible and in situation (AA) are also advantageous.

The resulting OH value of the reaction products mentioned above is from 7 to 56 mg KOH/g, preferably between 10 and 28 mg KOH/g. The viscosity of the starting product is greatly increased by the process when performed in the conventional temperature range of 20 to 50° C.

Since, as specified above, low molecular weight components with hydroxy and amine terminal groups, or even H₂O, may be incorporated in the preliminary reaction described, the reaction may also be started with a higher OH or OH/NHX group content. The viscosity achieved is modified in accordance.

EXAMPLES

1. OH-prepolymer Examples

Table of examples

|  | 1.1 | 1.2 | 1.3 |  |
|---|---|---|---|---|
| Basic ether (a) EO/PO = (25:75) (OH value: 28 mg KOH/g) | 98.95 | 97.95 | 98.65 | wt. % |
| TDI | 1.00 |  |  | wt. % |
| MDI prepolymer (20% NCO) |  | 2.0 |  | wt. % |
| IPDI |  |  | 1.3 | wt. % |
| Dabco (cryst.) | 0.05 | 0.05 | 0.05 | wt. % |
| Viscosity: start of reaction | 270 | 275 | 265 | mPa.s |
| (50° C.): end of reaction | 740 | 710 | 650 | mPa.s |
| OH value of reaction product | 22 | 22 | 22 | mg KOH/g |

1.1. Method:

After initial introduction of the OH component and raising the temperature to a constant 50° C., the Dabco constituent is dissolved and then the isocyanate component is added. The viscosity is determined after about 2 hours and this is found to be unaltered, with the same value even after 1 day and 7 days.

1.2 It is also possible to initially introduce only some of reactive OH component so that a more concentrated reaction mixture is present, Dabco and the isocyanate component also being added to this at 50° C. After reaction, the remaining amount of the OH reactive component is added and a product which is the same as that prepared by process 1.1. is obtained.

2. Reaction Examples 2.1 The unreacted basic polyol (a) in example table 1 is reacted with the following reaction partners:

| A component | polyol (a) | 93.87 |
|---|---|---|
|  | butanediol-1,4 | 6.00 |
|  | DBTL | 0.03 |
|  | Dabco (cryst.) | 0.10 |
| B component | MDI prepolymer made from 4,4'-MDI, Desmodur CD and etherpolyol (a) with a NCO content of 20% |  |
| Temperature of materials | 35° C. each |  |

The mixture A:B in the ratio 100:38 is processed with a conventional low pressure machine and poured into a mould and sealed. The moulded item with a thickness of 5 mm and a density of 1100 kg/m³ can be removed from the mould after 4 min. However, it is not transparent but has a white, milky appearance.

2.2 The reaction product from example 1.1 is used in the previous formulation. Using the same procedure and taking into account the low OH number of the OH prepolymer now used (A:B=100:36), a transparent moulded item can be removed from the mould after 4 min.

2.3 As a variant of the formulation for the direct production of soles of shoes, the following variant is selected:

| A component | polyol (a) | 92.97 |
|---|---|---|
|  | butanediol-1,4 | 6.00 |
|  | ethanediol | 0.50 |
|  | DBTL | 0.03 |
|  | Dabco (cryst.) | 1.00 |
| B component | (see example 2.1) |  |
| Temperature of materials: | 35° C. each |  |

The reaction mixture prepared by screw-mixing in accordance with the Desma process (A:B=100:41) is introduced into a mould held at 50° C. and the mould is sealed in accordance with the Desma process.

After about 2.5 min the mould is opened and a milky-white moulded item is obtained onto which another PUR material can be sprayed in a subsequent step.

2.4 As described under 2.3, but replacing polyol (a) with polyol (1.1) and with appropriate adjustment of the mixing ratio (A:B=100:39), however, a transparent moulded item can be removed from the mould after 2.5 min, onto which another PUR material can also be sprayed in a subsequent step.

What is claimed is:

1. A two-stage process for the production of semi-rigid, solid polyurethane molded articles having a high transparency and/or translucency, even at different thicknesses of molded articles, comprising reacting:
   a) at least one organic and/or modified organic polyisocyanate, with
   b) at least one high molecular weight compound containing at least two isocyanate-reactive hydrogen atoms, comprising
     (1) at least one OH-terminated prepolymer having an OH number of from 7 to 56 mg KOH/g, which contains no reactive isocyanate groups, and comprises the reaction product of
       (1A) a polyether polyol component being selected from the group consisting of:
         (I) a linear ethylene oxide/propylene oxide polyether polyol having terminal ethylene oxide groups, and an ethylene oxide/propylene oxide ratio of from 15:85 to 40:60, an OH number of from 28 to 56, and having a functionality of 2.0,
         (II) a mixture of (a) a polyether polyol as specified by (I) above, with (b) another higher functional ethylene oxide/propylene oxide polyether polyol initiated with glycerine, trimethylol-propane, pentaerythritol or sugar, having an ethylene oxide propylene oxide ratio of from 15:85 to 40:60, and having an OH number of from 25 to 60,
         (III) mixtures of several linear and branched polyether polyols, each of which comprises components (I) and/or (II)(b),
         (IV) a poly-tetrahydrofuran-ether having an average molecular weight of 500 to 2,000, and
         (V) mixtures thereof; with
       (1B) an isocyanate component being selected from the group consisting of:
         (A) isomers of toluene diisocyanate in any ratio, and/or prepolymers thereof,
         (B) toluene diisocyanate based polynuclear isocyanates and/or prepolymers thereof,
         (C) isomers of diphenylmethane diisocyanate in any ratio and/or prepolymers thereof, (D) diphenylmethane diisocyanate based polynuclear isocyanates and/or prepolymers thereof,
(E) an aromatic isocyanate having a functionality of at least two and which is obtainable on an industrial scale, and/or prepolymers thereof,
(F) an aliphatic isocyanate having a functionality of at least two and which is obtainable on an industrial scale, and/or prepolymers thereof, and
(G) mixtures thereof;

c) at least one low molecular weight chain extender and/or crosslinking agent, in the presence of, optionally, d) at least one amine and/or metal salt catalysts, and/or
e) additives.

2. The process of claim 1, wherein component b) additionally comprises OH-terminated prepolymers prepared from a proportion of short-chain reaction constituents with a suitable isocyanate component.

3. The process of claim 2, wherein said short-chain reaction constituents are selected from the group consisting of water, difunctional hydroxyl group containing compounds, trifunctional hydroxyl group containing compounds, alkanolamines, diamines, triamines, and mixtures thereof.

4. The process of claim 1, wherein b)(1) said OH-terminated prepolymer is prepared in the presence of one or more amine catalysts and/or one or more metal salt catalysts.

5. A two-stage process for the production of semi-rigid, solid polyurethane molded articles having a high transparency and/or translucency, even at different thicknesses of molded articles, comprising reacting:

a) at least one organic and/or modified organic polyisocyanate, with b) at least one high molecular weight compound containing at least two isocyanate-reactive hydrogen atoms, comprising:
  (1) at least one isocyanate-reactive component having an OH number of from 7 to 56 mg KOH/g, which contains no reactive carboxylic acid groups, and comprises the reaction product of:
    (1A) a polyether polyol component being selected from the group consisting of:
      (I) a linear ethylene oxide/propylene oxide polyether polyol having terminal ethylene oxide groups, and an ethylene oxide/propylene oxide ratio of from 15:85 to 40:60, OH number of from 28 to 56, and having a functionality of 2.0,
      (II) a mixture of (a) a polyether polyol as specified by (I) above, with (b) another higher functional ethylene oxide/propylene oxide polyether polyol initiated with glycerine, trimethylol-propane, pentaerythritol or sugar, having an ethylene oxide/propylene oxide ratio of from 15:85 to 40:60, and having an OH number of from 25 to 60; and
      (III) mixtures of several linear and branched polyether polyols, each of which comprises components (I) and/or (II)(b); with
    (1C) a difunctional and/or higher functional carboxylic acid component;

c) at least one low molecular weight chain extender and/or crosslinking agent, in the presence of, optionally, d) at least one amine and/or metal salt catalysts, and/or
e) additives.

* * * * *